No. 884,542.
PATENTED APR. 14, 1908.
C. J. TOBIN.
DRAFT EQUALIZER.
APPLICATION FILED DEC. 24, 1907.
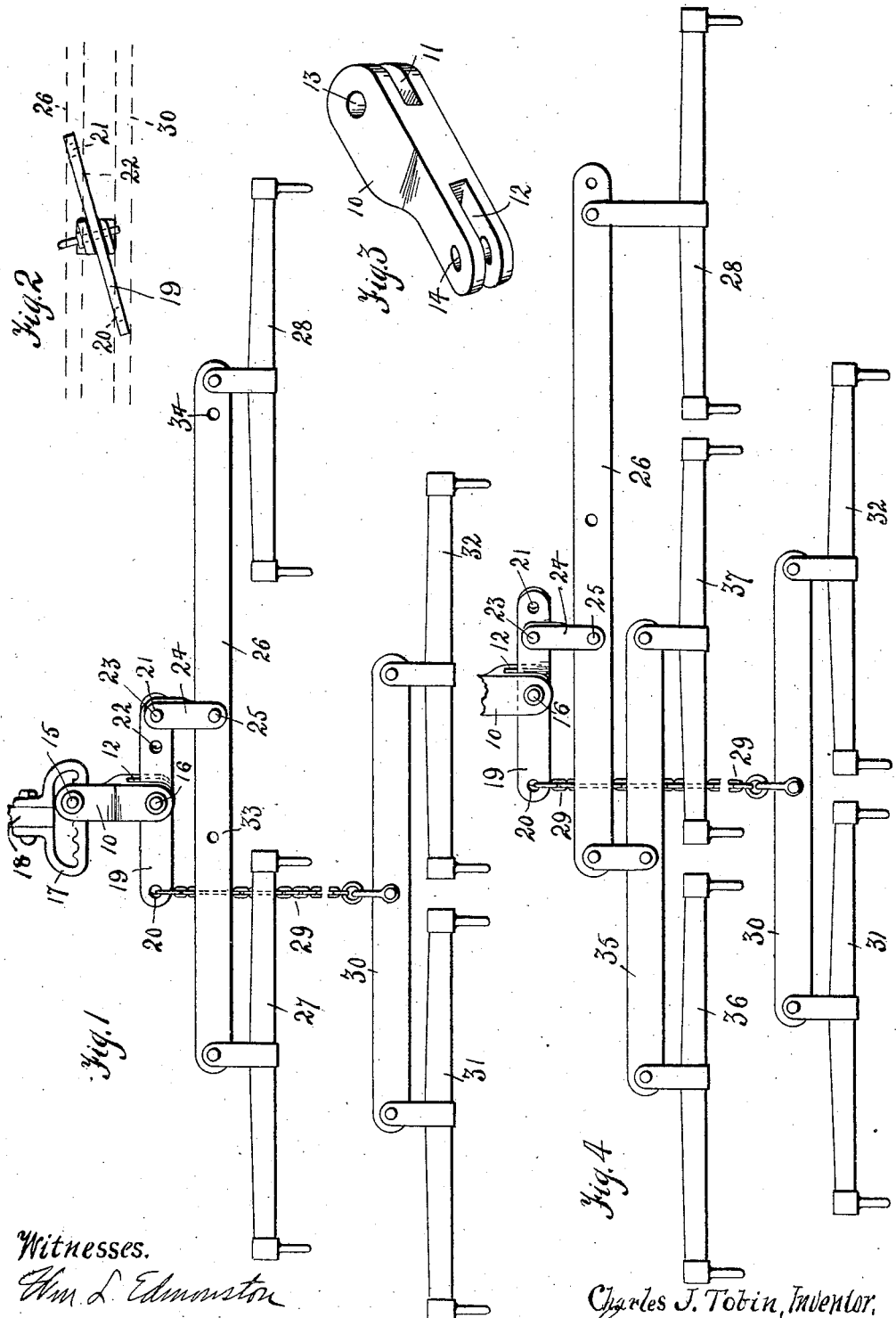
Witnesses.
Wm. L. Edmonston
C. N. Woodward
Charles J. Tobin, Inventor.
By Shoemaker & Brown Attys

UNITED STATES PATENT OFFICE.

CHARLES J. TOBIN, OF STUART, IOWA.

DRAFT-EQUALIZER.

No. 884,542.

Specification of Letters Patent.   Patented April 14, 1908.

Application filed December 24, 1907. Serial No. 407,962.

*To all whom it may concern:*

Be it known that I, CHARLES J. TOBIN, a citizen of the United States, residing at Stuart, in the county of Guthrie and State of Iowa, have invented certain new and useful Improvement in Draft-Equalizers, of which the following is a specification.

This invention relates to draft equalizers, more particularly to devices of this character adapted to employ four or five horses, as required, and has for its object to improve and simplify the construction, reduce the expense of manufacture without decreasing the utility and efficiency.

With these and other objects in view, the invention consists in certain novel features of construction, as hereafter shown and described and specifically pointed out in the claims, and in the drawings employed for illustrating the embodiment of the invention:—Figure 1 is a plan view of the improved device arranged for the employment of four horses. Fig. 2 is a front elevation of the improved device. Fig. 3 is an enlarged perspective view of the coupling clevis or clip. Fig. 4 is a plan view, similar to Fig. 1, illustrating the arrangement of the device when employed for five horses.

The improved device comprises a clevis or clip device 10 having a transverse horizontal slot 11 in one end and a diagonal slot 12 in the other end, the slots having perforations 13—14 to receive the securing pins 15—16. The horizontal slot 11 is designed to be connected by the pin 15 to the usual clevis portion 17 of the plow beam 18, as shown in Fig. 1, or the other draft appliances of the vehicle or machine to which the device is to be applied. Devices of this character are employed in connection with harvesters, gang and other plows, the larger forms of harrows and like implements, but is also adapted to any form of vehicle or machinery upon which devices of this character are usually employed, and we do not therefore desire to be limited in any manner to the apparatus with which the device is employed. For the purpose of illustration the device is shown in Fig. 1 applied to a conventional plow clevis 17, as before noted.

Pivoted by the pin 16 in the diagonal slot 12 of the clip 10 is a draft bar 19, having perforations 20—21 at its ends and an intermediate perforation 22 spaced a short distance from the perforation 21. Experiment has shown that the bar 19 should be about 12 inches long from center to center of the perforations 20—21 and the perforation 22 spaced about 2 inches from the perforation 21, but it will be understood that these proportions may be varied as required.

Pivoted by a pin 23 passing through the perforation 21 of the bar 19 is a link 24, and pivoted at 25 to the outer end of the link is a relatively long evener beam 26, the ends of the beam 26 being provided with swingle trees 27—28 of the usual form. The evener beam 26 is provided with perforations at its ends, a perforation at its center to receive the pin 25, and intermediate perforations 33—34, the perforation 33 being disposed between the central perforation and the end of the beam to which the swingle tree 27 is coupled, and the perforation 34 being near the perforation by which the swingle tree 28 is connected to the evener beam, the object to be hereafter explained. By this means two horses may be connected to one end of the bar 19, the beam 26, it will be noted, being coupled to the higher end of the beam 19.

Connected to the lower end of the beam 19 by a chain 29, which is coupled by a suitable link in the aperture 20, is an evener beam 30 having swingle trees 31—32 connected thereto. It will be understood that the chain 29 will be of sufficient length to enable the horses to be hitched to the swingle trees 31—32 in advance of the horses hitched to the swingle trees 27—28, the chain 29 being shown broken, to indicate this fact.

By the proportion and arrangement of the parts it will be noted that the chain 29 passes beneath the evener beam 26 and the swingle tree 27, and sufficiently near the inner end of the swingle tree 27 to avoid interference with the horse hitched to the swingle tree 27.

The link 24 and the chain 29 are coupled to the bar 19 at equal distances from the pin 16, so that the two teams will draw equally upon the clevis or clip 10, the leverage being thus equalized.

The arrangement above described will be employed when four horses are used, and when five horses are required the link 24 will be shifted at one end to the perforation 22 and at the other end to the perforation 33, as shown in Fig. 4, while the swingle tree 28 will be shifted to the perforation 34, and the swingle tree 27 replaced by an ordinary double tree evener 35 with its swingle trees 36—37, the beam 26 being thus transformed into an ordinary three horse evener, no change being required in the evener 30 and its swingle trees 31—32. By this means the beam 26 may be utilized both for a four horse and five horse equalizer.

It will be noted that by transferring the link 24 to the aperture 22 and coupling the evener 26 to the link by its aperture 33 the leverage is equalized between the two horses at one end of the evener beam, as shown in Fig. 4, and the single horse upon the longer end of the beam.

By the arrangement of the clip or clevis 10 with the slot 12 arranged obliquely so that the bar 19 is disposed at an angle to the horizontal, the chain 29 is disposed below the beam 26, and does not therefore interfere with its operation. This inclined arrangement of the bar 19 is an important feature of the invention, and materially increases its efficiency and utility, and enables the device to operate without undue friction or wear of the parts.

The device is extremely simple in construction, may be inexpensively manufactured, and readily adapted to the various uses to which devices of this character are appropriated.

Having thus described the invention, what is claimed as new is:—

1. In a draft equalizer, a clip having a horizontal slot in one end and an oblique slot in the other end, a draft bar pivoted in said oblique slot and supported thereby at an angle to the horizontal, an evener beam swinging from the higher end of the bar and provided with spaced draft appliances, a connecting element coupled to the lower end of the inclined bar and extending beneath the evener, and adapted to receive draft appliances at its forward end.

2. In a draft equalizer, a clip having coupling means at one end and with an obliquely disposed slot in the other end, a draft bar pivoted in said oblique slot and maintained thereby in an inclined position and provided with a plurality of spaced apertures, a rear evener beam provided with a plurality of spaced apertures and with draft appliances adjustably connected thereto, means for coupling said evener beam by its apertures to the higher portion of the draft bar by the apertures thereof, a forward evener beam having draft appliances connected thereto, and means for coupling said forward evener beam to the lower portion of said draft bar.

3. In a draft equalizer, a clip having coupling means at one end and with an oblique slot in the other end, a draft bar pivotally connected in said oblique slot and provided with a plurality of spaced apertures, and draft appliances adapted to be connected to said bar at opposite sides of said clip.

In testimony whereof I affix my signature, in presence of two witnesses.

CHARLES J. TOBIN.

Witnesses:
  Wm. Putney,
  Ben Gardner.